3,630,988
WHITE AND COLORABLE FLAME RESISTANT POLYAMIDE

Edward Johnson Deyrup, Wilmington, Del., assignor to E. I. du Pont de Nemours and Company, Wilmington, Del.
No Drawing. Filed Aug. 7, 1970, Ser. No. 62,203
Int. Cl. C08g 51/04, 51/14; C09k 3/28
U.S. Cl. 260—37 N                                    5 Claims

ABSTRACT OF THE DISCLOSURE

Polyamides are made sufficiently flame retardant to pass the Underwriters' Laboratory vertical flammability test, SE-1 (subject 746, May 13, 1966) by incorporation into the polyamide from 1–10% by weight of lead borate and an organic halide which is not reactive with the polyamide during melt processing of the polyamide but which reacts with the lead borate and polyamide during pyrolysis of the latter to produce a char, the total additive concentration being from 5 to 30% by weight. The resultant flame retardant polyamide has both good physical properties and is white, which means that the resin can be colored as desired. The resin is especially useful in electrical application such as wire coating.

---

This invention relates to flame retardant polyamides.

Flame retardant polyamide compositions are disclosed in U.S. Pat. 3,418,267 to Busse, wherein the flame retardance is obtained by incorporating certain metal oxides and nonreactive organic halides into the polyamide. The specific compositions disclosed in this patent pass the horizontal bar flammability test of ASTM D-635 and the more severe vertical bar test disclosed in the patent but do not pass the Underwriters' Laboratory Vertical Flammability Test SE-1 (subject 746, May 13, 1966) hereinafter referred to as the U.L. Flammability Test, without a deleterious effect on toughness of the composition. Recently it has been found that the oxide $Fe_3O_4$ together with the organic chloride 1,5-COD (to be described hereinafter) renders certain polyamides sufficiently flame retardant to pass the U.L. Flammability Test without sacrificing toughness, but the resultant polyamide has the disadvantage of being a black composition rendering it incapable of being colored. Coloring is important in some applications for aesthetic reasons or conductor identification in electrical circuitry.

The present invention involves the discovery that lead borate can be used in place of the metal oxide in the metal oxide/organic halide/polyamide compositions of U.S. Pat. 3,418,267 to provide a polyamide of improved flame retardance or to provide polyamides of similar flame retardance but at lower additive levels at which better physical properties for the polyamide are present. The composition of this invention is white, which means that it can be pigmented to any color desired.

As in the case in the aforementioned patent, the use of the nonreactive organic halide alone does not reduce flammability of the polyamide but instead increases the tendency of the polyamide to drip. The lead borate reacts with the organic halide and with the polyamide at its pyrolysis temperature to form a char which has the beneficial effects of being slower burning than the polyamide and of shielding the polyamide from direct contact with an external flame and further to prevent dripping of flaming molten droplets of the polyamide.

The lead borate is a well known article of commerce and is used in the present invention in the finely divided form such as minus 100 mesh particles. The lead borate can be a borate of lead in any of its valence forms and the lead borate can be with or without water of crystallization. Examples of such lead borates include lead diborate $(Pb(BO_2)_2)$, lead tetraborate $(Pb(BO_2)_4)$, and lead metaborate $(Pb(BO_2)_2 \cdot H_2O)$.

The organic halide is nonreactive in the sense that it should be melt blendable with the polyamide without any significant reaction with the polyamide. Thus the choice of organic halide will depend on its decomposition temperature and the melt processing time and temperature of the polyamide being used which will generally be at temperatures up to 270° C. In all cases, the organic halide should be reactive with the polyamide-lead borate system at the pyrolysis temperature of the polyamide to produce char.

Examples of the nonreactive organic halides include the stable cycloaliphatic halides and the stable aryl halides with the chlorides in each being preferred. The organic halides are preferably substituted with halogen only but other substituents can be present so long as they do not interfere with the fire retardant effect of halide when coupled with the lead borate. The cycloaliphatic halides include $C_{10}Cl_{12}$ and $C_{18}H_{12}Cl_{12}$ (Dechlorane® and Dechlorane Plus®, respectively), chlorendic acid and chlorendic anhydride. Dechlorane Plus is described in U.S. Pat. 3,382,204, column 4, line 15 and is believed to have the following structure:

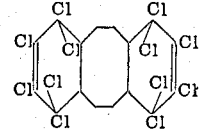

which is abbreviated herein as 1,5-COD. The aryl halides include mononuclear compounds such as pentabromophenol and polynuclear compounds such as chlorinated biphenyl and chlorinated terphenyl both containing greater than 50% by weight of chlorine and naphthalene containing at least 50% by weight of chlorine, such as the Halo waxes 1001, 1006, 1013, 1014 and 1051. The organic aromatic halides containing from 50–80% by weight of chlorine are preferred.

The polyamides which are useful in the flame retardant composition of the present invention include any of the well known polyamide molding resins such as those disclosed in U.S. Pats. 2,071,250, 2,071,251, 2,130,523, and 2,130,948. Examples of polyamides include polycaprolactam (6 nylon); the polyamides which are derived from the condensation of a dicarboxylic acid with a diamine, such as polyhexamethylene adipamide (66 nylon) and polyhexamethylene sebacamide (610 nylon); and copolymers thereof which may be designated as 66/610/6 nylon, 66/610 nylon, 66/6 nylon, and the like, such as a copolymer of hexamethylene adipamide units and hexamethylene dodecamide units (66/612 nylon). The polyamide should not contain ingredients such as unreacted monomer which promote combustibility. However, with due regard for this requirement, the polyamide can be compounded with stabilizing, coloring or modifying agents such as antioxidants, pigments, and reinforcing materials such as glass fibers.

The amount of organic halide and lead borate used will depend on the flame retardant effect desired for the particular polyamide resin used. If it is desired that the polyamide should pass the U.L. Flammability Test, then from 1–10% by weight lead borate and from 4 to 20% by weight of nonreactive organic halide should be present to give a total additive concentration of 5–30% by weight. If passage of a less stringent flammability test is desired, smaller proportions of this additive can be used. All weight percents disclosed herein unless otherwise specified are based on the total weight of the composition (polyamide+organic halide+lead borate, excluding water of crystallization, if any).

The preferred compositions of the present invention consist of a copolymer of hexamethylene adipamide units with sufficient other carbonamide units in the main copolymer chain to lower the melting point from that of pure polyhexamethylene adipamide, which is 265° C., to being no greater than 250° C. Examples of other carbonamide units include those derived from caprolactam, sebasic acid, and/or dodecanedioic acid being present in the polymerization system along with the hexamethylene diamine (in excess) and adipic acid. Preferred copolymers are those consisting of from 60–95% hexamethylene adipamide units and the remaining being of the other carbonamide forming units. The polyamide also preferably has a relative viscosity of 25–120. The melting point of the polyamide is determined by differential thermal analysis (DTA).

The preferred organic halides are the chlorinated biphenyls and chlorinated terphenyls and the aforementioned cycloaliphatic halides as chlorides. Best results have been obtained using a combination of these preferred organic halides, it appearing that the chlorinated bi- or terphenyl acts as a dispersing agent for the lead borate in the polyamide. Generally, this combination of organic halides will consist of from 0.5–10% by weight of chlorinated bi- or terphenyl, sufficient cycloaliphatic chloride, but at least 1% by weight thereof, such as $C_{10}Cl_{12}$ or $C_{18}H_{12}Cl_{12}$, to have at least 4% by weight of organic halide present in the composition, with the remainder being lead borate to total not more than 30% by weight of the composition.

The composition of this invention will normally be supplied in some form subsequent to melt blending of the additives with the polyamide, such as molding powder or a molded article. To prepare the melt blend, the polyamide, organic halide and lead borate can be compounded to form an intimate uniform mixture by any of the well known methods and machines available with precautions being taken to minimize or avoid degradation. The ingredients can be mixed in the dry form and can then be extruded or molded to the shape desired. The organic halide or lead borate can be incorporated into the molten polymer as it is synthesized if the time-temperature cycle is not such as to cause premature decomposition. Useful compounding machines include the Banbury mill, extruders and the like. It is desirable to conduct the compounding in the absence of air by having the atmosphere present in the mixing equipment an inert gas such as nitrogen, to avoid oxidation. The resultant compositions are white, including off white, so as to be colorable and can be fabricated into useful articles such as sheets or films or molded or extruded shapes such as wire coatings by the conventional techniques which are applicable to polyamides.

The U.L. Flammability Test can be summarized as follows: The test specimen of the composition can be tested in the form of a bar 0.159 x 1.27 x 12.7 cms. and the specimen is tested as received and after each heat aging at 70° C. The test specimen is held in a vertical position with its lower free end exposed to the blue portion of a Bunsen burner flame for 10 seconds. In order to be classified as SE-1 (self-extinguishing group 1) according to this test, the specimen must cease glowing (including flaming) within 30 seconds (within an average of 25 seconds for 3 specimens) after removal of the burner flame, and dripping flaming particles which would ignite surgical cotton placed below the specimen must not have occured. The same parameters of non-flammability must be met on a retest of the charred end of the test specimen under the same conditions.

An even more severe test is the test Mil–W–22759/13 (AS) which can be summarized as follows:

A wire which has been coated with the polymeric composition to be tested is positioned vertically in a draft-free chamber and is ignited at the bottom of the wire by a Bunsen burner at an angle of 20° to the vertical plane to the wire. Flame temperature should not be less than 955° C.; inner cone height is to be 2.54 cm. outer height is to be 7.62 cm.; and the bore of the burner is to be 0.95 cm. Ignition time with the tip of the inner cone is 15 seconds. In order to pass this test, the composition, after removal of the Bunsen burner flame must not burn for more than 6 seconds. There also should be no flaming drips.

Examples of compositions of the present invention are as follows. In these examples, parts and percentages are by weight unless otherwise specified.

EXAMPLE 1

In this example, the polyamide used was a 66/6 copolymer consisting of 77% by weight hexamethylene adipamide units and 23% by weight caprolactam derived units (based on the total weight of the polyamide), having a melting point of 220° C. and a relative viscosity of 50. A series of compositions were made up by dry mixing lead metaborate and organic halide with molding granules of the copolymer in a polyethylene bag, followed by melt compounding in an extruder at a melt temperature of 250–270° C. The compositions were as follows:

| Composition | Lead metaborate, wt. percent [1] | Organic halide, wt. percent |
|---|---|---|
| a | None | None |
| b | 5 | 11—1,5-COD. |
| c | 8 | 8—1,5-COD. |
| d | 8 | {8—1,5-COD. {8—chlorinated terphenyl. |
| e | 6 | {8—1,5-COD. {4—chlorinated terphenyl. |
| f | 8 | 12—1,5-COD. |

[1] Including water of crystallization.

The chlorinated terphenyl had a chlorine content of 68% by weight based on the total weight of the chlorinated terphenyl and is available as Arochlor® 5460. The resultant compositions were white in appearance.

The flame retardance of the compositions was determined by extrusion coating the compositions over 22 gauge wire which was previously coated with tetrafluoroethylene/hexafluoropropylene copolymer. The wire with the fluorocarbon copolymer coating had a diameter of about 0.152 cm. prior to coating with polyamide composition. The extrusion conditions of the polyamide composition coating was a melt temperature of 220–250° C. The compositions were coated in 0.013 cm. and 0.025 cm. thicknesses on separate samples. The resultant coated wires were subjected to flammability test MIL 22759/13 (AS). The wires coated with composition a continued burning for greater than 24 seconds after removal of the Bunsen burner flame and dipping of flaming drops of the polyamide composition occurred. For wires coated with compositions b through f of the present invention, the polyamide composition coating formed a cohesive char which was self-extinguishing within 2 seconds after removal of the flame and did not drip.

When this experiment was repeated to form composition c except that PbO was substituted for lead metaborate, the resultant composition was light yellow and although it did char, it also burned for 24 seconds after removal of the Bunsen burner flame.

The additives present in compositions b through f did not have a deleterious effect on the physical properties of the polyamide as illustrated by the following comparison of composition a with composition e on tests of molded bars. Composition a had a tensile strength of 742 kg./cm.$^2$, elongation of 30%, flex modulus of 23,100 kg./cm.$^2$, deflection temperatures of 134° C. at 4.83 kg./cm.$^2$ and 48° C. at 18.48 kg./cm.$^2$. Composition e had a tensile strength of 770 kg./cm.$^2$, an elongation of 32%, a flex modulus of 25,200 kg./cm.$^2$ and deflection temperatures of 135° C. at 4.83 kg./cm.$^2$ and 52° C. at 18.48 kg./cm.$^2$. Both compositions passed the mandrel wrap test of MIL 5086B involving wrapping a wire around a 0.95 cm. diameter mandrel for 24 hours at 95° C. followed by unwrapping and inspecting for cracks in the polymeric coating (the wire was 20 gauge standard wire first coated with polyvinyl chloride to a thickness of 0.038 cm. followed by a coating of the test composition 0.011 to 0.014 cm. thick).

EXAMPLE 2

To a Waring Blendor was added 141 gm. of Arochlor® 5460, 290 gm. of 1,5-COD, and 217 gm. of lead metaborate for premixing and this premixture was then dry mixed with 2985 gm. of the polyamide copolymer used in Example 1. The resultant mixture was then melt blended in an extruder at a maximum temperature of 250° C.

A second blend was made in the same way except that no Arochlor® 5460 was added and the quantity of polyamide copolymer was 3120 gm.

These blends were then extrusion coated to form 8 mil thick coatings on 22 gauge base wire and 0.013 cm. thick coatings on polyvinyl chloride coated wire. The coatings made from the first composition were smoother than those made from the second composition, indicating improved dispersion of the additives in the polyamide by the Arochlor® 5460 of the first composition. The base coated wire samples were coiled in a diameter of 6.3 times the diameter of the coated wire and heated for 15 minutes at 150° C. followed by cooling in a desiccator. Upon uncoiling, the wire coated with the second composition exhibited 8 cracks in the coating per 30.5 cm. of wire as compared to only 1 crack per 61 cm. of wire coating with the first composition, illustrating the improved toughness of the latter even though it contained a greater amount of additive.

For the wires coated first with polyvinyl chloride and then with polyamide composition, those coated with the first composition passed the recently proposed flammability test (using a 12 second ignition in a cool (no air) flame, directly under the bottom of the vertical wire) and those coated with the second composition did not pass.

Both compositions were injected molded into the test bars normally used for the UL flammability test and both compositions passed this test. Both compositions were also white.

EXAMPLE 3

The preparation of compositions a and e of Example 1 was repeated substantially in accordance with the procedure set for in that example, except that the copolymer consisted of 80% by weight of hexamethylene adipamide units and 20% by weight of caprolactam derived units (relative viscosity about 50 and melting point of 220° C.). The modified composition a of this example failed the UL flammability test by virtue of the composition dripping flaming droplets which ignited the cotton below. The modified composition e of this example was white in appearance and passed the UL flammability test, exhibiting a flaming time after removal of the Bunsen burner flame of less than two seconds. Modified composition e was also subjected to ASTM D-635 flammability test and achieved a rating of non-burning.

EXAMPLE 4

The preparation of composition e of Example 1 was repeated substantially in accordance with the procedure set forth in that example, except that the polyamide was polycaprolactam having a relative viscosity of about 60 and melting point of 225° C. The composition was compression molded into test bars which were subjected to the horizontal bar flammability test of ASTM D-635 and achieved a rating of non-burning. The test bars charred upon exposure to the Bunsen burner flame which imparted a reduced tendency to burn and drop to the composition as compared to the polycaprolactam which drips and burns after removal of the Bunsen burner flame until the test bar is consumed.

As many apparently widely different embodiments of this invention may be made without departing from the spirit and scope thereof, it is to be understood that this invention is not limited to the specific embodiments thereof, except as defined in the appended claims.

I claim:

1. A flame retardant composition consisting essentially of polyamide and a flame retardant effective amount of lead borate and an organic halide which is substantially nonreactive with said polyamide except at its pyrolysis temperature, the amount of said lead borate being from 1 to 10% by weight and at least 4% by weight of said organic halide, the total additive concentration being no greater than 30% by weight.

2. The composition of claim 1 wherein said organic halide includes from 0.5 to 10% by weight of chlorinated biphenyl or chlorinated terphenyl and sufficient cycloaliphatic chloride, but at least 1% by weight thereof, to total said 4% by weight.

3. The composition of claim 1 wherein said organic halide contains from 50 to 80% by weight of chlorine.

4. The composition of claim 1 wherein said polyamide is a copolymer of hexamethylene adipamide units and sufficient other carbonamide units so that the copolymer has a melting point of no greater than 250° C.

5. The composition of claim 1 wherein said organic halide is a polynuclear aromatic chloride having a chlorine content of at least 50% by weight.

References Cited

UNITED STATES PATENTS

| 3,340,227 | 9/1967 | Krieger | 260—45.75 |
| 3,367,863 | 2/1968 | Cooper | 252—2 |
| 3,418,267 | 12/1968 | Busse | 260—33.8 |

MORRIS LIEBMAN, Primary Examiner

RICHARD ZAITLEN, Assistant Examiner

U.S. Cl. X.R.

106—15 FP; 260—47.75